US00RE49228E

(19) United States
(12) Reissued Patent
Li et al.

(10) Patent Number: US RE49,228 E
(45) Date of Reissued Patent: Oct. 4, 2022

(54) TROFFER-STYLE FIXTURE

(71) Applicant: IDEAL Industries Lighting LLC, Racine, WI (US)

(72) Inventors: Chi Man Chris Li, N.T. (HK); Chi Hoi Felix Mung, Kowloon (HK); Ho Ching Gauss So, Kowloon (HK); Wai To Yan, N.T. (HK)

(73) Assignee: IDEAL Industries Lighting LLC, Racine, WI (US)

(21) Appl. No.: 29/786,731

(22) Filed: Jun. 2, 2021

Related U.S. Patent Documents

Reissue of:
(64) Patent No.: Des. 807,556
Issued: Jan. 9, 2018
Appl. No.: 29/525,657
Filed: Apr. 30, 2015

U.S. Applications:
(60) Division of application No. 29/720,033, filed on Jan. 9, 2020, now Pat. No. Re. 48,620, which is an application for the reissue of Pat. No. Des. 807,556, which is a continuation-in-part of application No. 29/481,156, filed on Feb. 2, 2014, now Pat. No. Des. 772,465, which is a continuation-in-part of application No. 14/170,627, filed on Feb. 2, 2014, now Pat. No. 10,451,253.

(51) LOC (13) Cl. ..... 26-05
(52) U.S. Cl.
USPC ..... D26/74
(58) Field of Classification Search
USPC ..... D26/72, 74, 75, 76, 77, 78, 79, 85, 88, D26/89, 118, 138, 141
CPC ..... F21V 29/2262; F21V 7/06; F21V 21/044; F21V 21/047; F21V 29/2212; F21V 29/2225; F21V 29/2256; F21V 29/225; F21V 29/2268; F21Y 2111/002; F21S 8/02; F21S 8/026
See application file for complete search history.

(56) References Cited

U.S. PATENT DOCUMENTS

| | | | | |
|---|---|---|---|---|
| D85,382 | S | 10/1931 | Guth | D26/24 |
| 2,356,654 | A | 8/1944 | Cullman | 200/84 C |
| 3,381,124 | A | 4/1968 | Eisenberg | 362/354 |
| 3,743,826 | A | 7/1973 | Halfaker | |
| 4,939,627 | A | 7/1990 | Herst et al. | 362/299 |
| 5,025,356 | A | 6/1991 | Gawad | 362/221 |
| 5,222,800 | A | 6/1993 | Chan et al. | |
| 5,526,190 | A | 6/1996 | Hubble, III | 347/102 |
| 5,823,663 | A | 10/1998 | Bell et al. | 362/362 |
| D407,473 | S | 3/1999 | Wimbock | D23/328 |
| 6,079,851 | A | 6/2000 | Altman | |
| 6,102,550 | A | 8/2000 | Edwards, Jr. | |
| 6,149,283 | A | 11/2000 | Conway et al. | 362/236 |
| 6,155,699 | A | 12/2000 | Miller et al. | 362/293 |
| 6,210,025 | B1 | 4/2001 | Schmidt et al. | 362/362 |
| 6,234,643 | B1 | 5/2001 | Lichon, Jr. | 362/147 |
| 6,402,347 | B1 | 6/2002 | Maas et al. | 362/294 |
| 6,443,598 | B1 | 9/2002 | Morgan | |
| 6,523,974 | B2 | 2/2003 | Engel | 362/224 |
| 6,578,979 | B2 | 6/2003 | Truttmann-Battig | 362/92 |
| 6,598,998 | B2 | 7/2003 | West | 257/E33.073 |
| D496,121 | S | 9/2004 | Santoro | D26/74 |
| 6,871,983 | B2 | 3/2005 | Jacob et al. | 362/364 |
| 6,948,838 | B2 | 9/2005 | Kunstler | 362/237 |
| 6,948,840 | B2 | 9/2005 | Grenda et al. | |
| 6,951,415 | B2 | 10/2005 | Amano | 362/297 |
| 7,021,797 | B2 | 4/2006 | Minano et al. | 362/355 |
| 7,049,761 | B2 | 5/2006 | Timmermans et al. | 315/246 |
| 7,063,449 | B2 | 6/2006 | Ward | 345/102 |
| 7,109,880 | B2 * | 9/2006 | Sibalich | F21S 8/02 340/693.5 |
| 7,111,969 | B2 | 9/2006 | Bottesch | 362/299 |
| 7,175,296 | B2 | 2/2007 | Cok | 362/147 |
| 7,213,940 | B1 | 5/2007 | Van De Ven et al. | 362/231 |
| 7,217,004 | B2 | 5/2007 | Park | 362/240 |
| 7,237,924 | B2 | 7/2007 | Martineau et al. | 362/231 |
| D556,358 | S | 11/2007 | Santoro | D26/74 |
| 7,338,182 | B1 | 3/2008 | Hastings et al. | 362/150 |
| 7,341,358 | B2 | 3/2008 | Hsieh | 362/97.1 |
| 7,510,299 | B2 | 3/2009 | Timmermans et al. | 362/225 |
| 7,520,636 | B2 | 4/2009 | Van Der Poel | 362/290 |
| D593,246 | S | 5/2009 | Fowler et al. | D26/76 |
| 7,559,672 | B1 | 7/2009 | Parkyn et al. | 362/244 |
| 7,594,736 | B1 | 9/2009 | Kassay et al. | 362/225 |
| D604,446 | S | 11/2009 | Fowler et al. | D26/76 |
| 7,618,157 | B1 | 11/2009 | Galvez et al. | 362/294 |
| 7,618,160 | B2 | 11/2009 | Chinniah et al. | 362/326 |
| D608,932 | S | 1/2010 | Castelli | D26/76 |
| 7,654,688 | B2 | 2/2010 | Li | |

(Amended)

7,654,702 B1 2/2010 Ding et al.
7,661,844 B2 2/2010 Sekiguchi et al. ..... 362/249.02
D611,183 S 3/2010 Duarte ..... D26/76
7,674,005 B2 3/2010 Chung et al. ..... 362/223
7,686,470 B2 3/2010 Chiang ..... 362/147
7,686,484 B2 3/2010 Heiking et al. ..... 362/375
7,712,918 B2 5/2010 Siemiet et al. ..... 362/241
7,722,220 B2 5/2010 Van De Ven ..... 362/294
7,722,227 B2 5/2010 Zhang et al. ..... 362/364
D617,487 S 6/2010 Fowler et al. ..... D26/76
7,768,192 B2 8/2010 Van De Ven et al. ..... 313/503
7,815,338 B2 10/2010 Siemiet et al. ..... 362/218
D628,335 S * 11/2010 Hyland ..... D26/74
7,824,056 B2 11/2010 Madireddi et al. ..... 362/125
7,828,468 B2 11/2010 Mayfield et al. ..... 362/342
D632,007 S * 2/2011 Kim ..... D26/120
D633,247 S 2/2011 Kong et al. ..... D26/88
7,922,354 B2 4/2011 Everhart ..... 362/235
7,926,982 B2 4/2011 Liu ..... 362/294
7,959,332 B2 6/2011 Tickner
7,988,321 B2 8/2011 Wung et al. ..... 362/218
7,988,335 B2 8/2011 Liu et al. ..... 362/294
7,991,257 B1 8/2011 Coleman ..... 264/1.24
7,993,034 B2 8/2011 Wegner ..... 362/296.05
7,997,762 B2 8/2011 Wang et al.
8,038,314 B2 10/2011 Ladewig
8,038,321 B1 10/2011 Franck et al. ..... 362/249.02
8,058,659 B2 11/2011 Bisberg
8,070,326 B2 12/2011 Lee ..... 362/307
D653,376 S 1/2012 Kong et al. ..... D26/76
8,092,043 B2 1/2012 Lin et al. ..... 362/249.02
8,092,049 B2 1/2012 Kinnune et al. ..... 362/294
8,096,671 B1 1/2012 Cronk ..... 362/147
D657,488 S 4/2012 Lown et al. ..... D26/120
8,162,504 B2 4/2012 Zhang et al. ..... 362/217
8,186,855 B2 5/2012 Wassel et al. ..... 362/373
8,197,086 B2 6/2012 Watanabe et al. ..... 362/218
8,201,968 B2 6/2012 Maxik et al.
D663,881 S * 7/2012 Janssen ..... D26/74
D664,699 S 7/2012 Nakahira et al.
8,215,799 B2 7/2012 Vanden Eynden et al. .. 362/294
8,246,219 B2 8/2012 Teng ..... 362/217.02
8,256,927 B2 9/2012 Hu ..... 362/218
8,287,160 B2 10/2012 Shen
D670,849 S 11/2012 Lay et al. ..... D26/74
8,317,354 B2 11/2012 Gassner et al. ..... 362/147
D675,369 S * 1/2013 Michaud ..... D26/118
D676,848 S 2/2013 Smith et al.
D677,418 S * 3/2013 Wilson ..... D26/74
D677,821 S * 3/2013 Jeon ..... D26/74
D679,848 S 4/2013 Pickard et al. ..... D26/74
D679,849 S * 4/2013 Ham ..... D26/74
8,410,514 B2 4/2013 Kim ..... 257/99
D684,291 S 6/2013 Goelz et al. ..... D26/74
8,480,252 B2 7/2013 Bertram et al.
8,506,135 B1 8/2013 Oster
D690,868 S * 10/2013 Mayfield, III ..... D26/74
D690,875 S * 10/2013 McKenzie ..... D26/118
8,556,452 B2 10/2013 Simon ..... 362/217.07
D693,952 S * 11/2013 Soni ..... D26/74
8,591,058 B2 11/2013 Concepcion ..... 362/231
8,591,071 B2 11/2013 Hochstein ..... 362/294
D696,449 S 12/2013 Boyer et al.
8,602,601 B2 12/2013 Khazi
8,616,723 B2 12/2013 Zhang ..... 362/218
D698,969 S * 2/2014 Johns ..... D26/74
D698,974 S * 2/2014 Aniserowicz ..... D26/74
D698,975 S 2/2014 Blessitt et al. ..... D26/74
D699,386 S 2/2014 Park et al.
8,641,243 B1 2/2014 Rashidi ..... 362/373
D701,988 S 4/2014 Clements ..... D26/74
D702,393 S * 4/2014 Ansierowicz ..... D26/89
D702,868 S * 4/2014 Patel ..... D26/74
8,696,154 B2 4/2014 Hutchens ..... 362/217.05
8,702,264 B1 4/2014 Rashidi ..... 362/147
8,764,244 B2 7/2014 Jeon ..... 362/218
D714,988 S 10/2014 Park et al. ..... D26/74
D721,198 S 1/2015 Glasbrenner ..... D26/76
D725,819 S * 3/2015 Reynolds ..... D26/118
9,010,956 B1 4/2015 Davis
D732,233 S 6/2015 Reynolds
9,052,075 B2 6/2015 Demuynck et al.
D747,529 S * 1/2016 Yoon ..... D26/74
D750,312 S * 2/2016 Reynolds ..... D26/118
D750,313 S * 2/2016 Reynolds ..... D26/118
D766,497 S * 9/2016 Salomon ..... D26/138
D772,465 S * 11/2016 Li ..... D26/74
9,494,294 B2 * 11/2016 Edmond ..... F21S 8/06
D786,477 S * 5/2017 Lauderdale ..... D26/76
D786,489 S * 5/2017 Stanley ..... D26/118
D786,491 S * 5/2017 Reynolds ..... D26/118
2003/0063476 A1 4/2003 English et al.
2004/0001344 A1 1/2004 Hecht ..... 362/555
2004/0085779 A1 5/2004 Pond et al. ..... 362/516
2004/0100796 A1 5/2004 Ward
2004/0240230 A1 12/2004 Kitajima ..... 362/558
2005/0180135 A1 8/2005 Mayer ..... 362/240
2005/0264716 A1 12/2005 Kim et al.
2005/0281023 A1 12/2005 Gould ..... 362/217
2006/0221611 A1 10/2006 Noh et al. ..... 362/247
2006/0262521 A1 11/2006 Piepgras et al. ..... 362/149
2006/0291206 A1 12/2006 Angelini et al. ..... 362/244
2007/0070625 A1 3/2007 Bang ..... 362/240
2007/0109779 A1 5/2007 Sekiguchi et al.
2007/0115670 A1 5/2007 Roberts et al.
2007/0115671 A1 5/2007 Roberts et al.
2007/0211457 A1 9/2007 Mayfield et al. ..... 362/223
2007/0253205 A1 11/2007 Welker ..... 362/373
2007/0297181 A1 12/2007 Mayfield et al. ..... 362/342
2008/0019147 A1 1/2008 Erchak ..... 362/607
2008/0037284 A1 2/2008 Rudisill ..... 362/629
2008/0049422 A1 2/2008 Trenchard et al. ..... 362/238
2008/0232093 A1 9/2008 Kim ..... 362/147
2008/0278943 A1 11/2008 Van Der Poel ..... 362/240
2009/0034247 A1 2/2009 Boyer ..... 362/225
2009/0073693 A1 3/2009 Nall ..... 362/249.02
2009/0161356 A1 6/2009 Negley et al. ..... 362/231
2009/0168439 A1 7/2009 Chiang ..... 362/404
2009/0196024 A1 8/2009 Heiking et al. ..... 362/150
2009/0225543 A1 9/2009 Jacobson et al.
2009/0237958 A1 9/2009 Kim
2009/0262543 A1 10/2009 Ho ..... 362/373
2009/0296388 A1 12/2009 Wu et al. ..... 362/235
2009/0310354 A1 12/2009 Zampini et al. ..... 362/235
2009/0323334 A1 12/2009 Roberts et al.
2010/0061108 A1 3/2010 Zhang et al. ..... 362/364
2010/0097794 A1 4/2010 Teng et al. ..... 362/231
2010/0103678 A1 4/2010 Van de Ven et al. ..... 362/294
2010/0110679 A1 5/2010 Teng et al.
2010/0110699 A1 5/2010 Chou
2010/0226139 A1 5/2010 Teng et al.
2010/0157608 A1 6/2010 Chen et al.
2010/0172133 A1 7/2010 Liu ..... 362/235
2010/0177532 A1 7/2010 Simon et al. ..... 362/555
2010/0188609 A1 7/2010 Matsuki et al.
2010/0253591 A1 10/2010 Hwu et al. ..... 345/1.3
2010/0254128 A1 10/2010 Pickard et al. ..... 362/231
2010/0254145 A1 10/2010 Yamaguchi
2010/0254146 A1 10/2010 McCanless
2010/0270903 A1 10/2010 Jao et al. ..... 313/46
2010/0271843 A1 10/2010 Holten et al. ..... 362/609
2010/0277905 A1 11/2010 Janik et al. ..... 362/235
2010/0277934 A1 11/2010 Oquendo, Jr. ..... 362/433
2010/0295468 A1 11/2010 Pedersen et al. ..... 315/294
2010/0302778 A1 12/2010 Dabiet
2010/0327768 A1 12/2010 Kong et al. ..... 315/294
2011/0032714 A1 2/2011 Chang ..... 362/373
2011/0043132 A1 2/2011 Kim et al. ..... 362/235
2011/0090671 A1 4/2011 Bertram et al.
2011/0141722 A1 6/2011 Acampora et al. ..... 362/218
2011/0141734 A1 6/2011 Li ..... 362/235
2011/0156584 A1 6/2011 Kim ..... 315/32
2011/0164417 A1 7/2011 Huang ..... 362/235
2011/0175533 A1 7/2011 Homan ..... 315/130
2011/0199005 A1 8/2011 Bretschneider et al.
2011/0199769 A1 8/2011 Bretschneider et al.
2011/0246146 A1 10/2011 Kauffman et al. ..... 703/2
2011/0255292 A1 10/2011 Shen ..... 362/311

| | | | | |
|---|---|---|---|---|
| 2011/0267810 | A1 | 11/2011 | Higman et al. | 362/218 |
| 2011/0267823 | A1 | 11/2011 | Angelini et al. | 362/277 |
| 2011/0286225 | A1 | 11/2011 | Konishi | |
| 2011/0305024 | A1 | 12/2011 | Chang | 362/294 |
| 2012/0033420 | A1 | 2/2012 | Kim et al. | 362/235 |
| 2012/0038289 | A1 | 2/2012 | Jee et al. | 315/291 |
| 2012/0051041 | A1 | 3/2012 | Edmond et al. | 362/231 |
| 2012/0120658 | A1 | 5/2012 | Wilk | |
| 2012/0127714 | A1 | 5/2012 | Rehn | |
| 2012/0134146 | A1 | 5/2012 | Smith | 362/225 |
| 2012/0140442 | A1 | 6/2012 | Woo | 362/95 |
| 2012/0140461 | A1 | 6/2012 | Pickard | |
| 2012/0206926 | A9 | 8/2012 | Chou | |
| 2013/0235568 | A1 | 9/2013 | Green et al. | 362/218 |
| 2013/0242550 | A1 | 9/2013 | Suen | |
| 2013/0258652 | A1 | 10/2013 | Hsieh | 362/225 |
| 2014/0265930 | A1 | 9/2014 | Harris | 315/307 |
| 2014/0268692 | A1 | 9/2014 | Edmond et al. | |
| 2014/0268747 | A1 | 9/2014 | Demuynck et al. | |
| 2015/0016100 | A1 | 1/2015 | Ishii | 362/223 |
| 2015/0159852 | A1* | 6/2015 | Dahlen | F21V 29/503 362/249.02 |
| 2015/0219319 | A1 | 8/2015 | Li et al. | |

FOREIGN PATENT DOCUMENTS

| | | | |
|---|---|---|---|
| CN | 1762061 | | 4/2006 |
| CN | 1762061 | A | 4/2006 |
| CN | 1934389 | | 3/2007 |
| CN | 1934389 | A | 3/2007 |
| CN | 1963289 | A | 5/2007 |
| CN | 101188261 | | 5/2008 |
| CN | 101188261 | A | 5/2008 |
| CN | 101660715 | | 3/2010 |
| CN | 101660715 | A | 3/2010 |
| CN | 101776254 | | 7/2010 |
| CN | 101776254 | A | 7/2010 |
| CN | 101790660 | | 7/2010 |
| CN | 101790660 | A | 7/2010 |
| CN | 102072443 | | 5/2011 |
| CN | 102072443 | A | 5/2011 |
| CN | 202580962 | | 12/2012 |
| CN | 202580962 | U | 12/2012 |
| DE | 102007030186 | | 1/2009 |
| DE | 102007030186 | A1 | 1/2009 |
| DE | 202010001832 | | 7/2010 |
| DE | 202010001832 | U1 | 7/2010 |
| EP | 1298383 | A2 | 2/2003 |
| EP | 1298383 | | 4/2003 |
| EP | 1298383 | A2 | 4/2003 |
| EP | 1357335 | A2 | 10/2003 |
| EP | 1653254 | A2 | 5/2006 |
| EP | 1737051 | | 12/2006 |
| EP | 1737051 | A1 | 12/2006 |
| EP | 1847762 | | 10/2007 |
| EP | 1847762 | A2 | 10/2007 |
| EP | 1860467 | | 11/2007 |
| EP | 1860467 | A1 | 11/2007 |
| EP | 2287520 | A2 | 2/2011 |
| EP | 2290690 | A2 | 3/2011 |
| EP | 2636945 | A2 | 9/2013 |
| EP | 2636945 | A2 | 11/2013 |
| ER | 1653254 | | 3/2006 |
| GB | 774198 | | 5/1957 |
| JP | H1069809 | A | 3/1998 |
| JP | 1069809 | | 10/1998 |
| JP | 2002344027 | | 11/2002 |
| JP | 2002344027 | A | 11/2002 |
| JP | U3097327 | | 8/2003 |
| JP | 3097327 | U | 1/2004 |
| JP | 2004140324 | | 5/2004 |
| JP | 2004140327 | A | 5/2004 |
| JP | 2004345615 | | 12/2004 |
| JP | 2004345615 | A | 12/2004 |
| JP | 2006173624 | | 6/2006 |
| JP | 2006173624 | A | 6/2006 |
| JP | 2008147044 | | 6/2008 |
| JP | 2008147044 | A | 6/2008 |
| JP | 3151501 | U | 3/2009 |
| JP | 2009295577 | | 12/2009 |
| JP | 2009295577 | A | 12/2009 |
| JP | 2010103687 | | 5/2010 |
| JP | 2010103687 | A | 5/2010 |
| JP | 2011018571 | A | 1/2011 |
| JP | 2011018572 | A | 1/2011 |
| JP | 2011018571 | | 8/2011 |
| JP | 2011018572 | | 8/2011 |
| JP | 2006173624 | | 6/2016 |
| TW | 200524186 | | 7/2005 |
| TW | 200524186 | A | 7/2005 |
| TW | 200914759 | A | 4/2009 |
| TW | 201018826 | | 5/2010 |
| TW | 201018826 | A | 5/2010 |
| WO | WO 03102467 | | 11/2003 |
| WO | 03102467 | A2 | 12/2003 |
| WO | 2009030233 | A1 | 3/2009 |
| WO | WO 2009030233 | | 3/2009 |
| WO | WO 2009140761 | A1 | 11/2009 |
| WO | WO 2009157999 | | 12/2009 |
| WO | WO 2009157999 | A | 12/2009 |
| WO | WO 2009157999 | A1 | 12/2009 |
| WO | WO 2010024583 | | 3/2010 |
| WO | WO 2010024583 | A2 | 3/2010 |
| WO | WO 2010042216 | | 4/2010 |
| WO | WO 2010042216 | A2 | 4/2010 |
| WO | WO2011074424 | A1 | 6/2011 |
| WO | 2011098191 | A1 | 8/2011 |
| WO | WO 2011096098 | A1 | 8/2011 |
| WO | WO 2011098191 | | 8/2011 |
| WO | WO 2011118991 | A2 | 9/2011 |
| WO | WO 2011140353 | A2 | 11/2011 |
| WO | WO 03102467 | | 12/2013 |

OTHER PUBLICATIONS

Cree LR24 Product Specification, www.cree.com/lighting.

White97 film Technical Data Sheet from WhiteOptics, LLC of New Castle.

Ex Parte Quayle Action for U.S. Appl. No. 29/481,156, mailed Jan. 22, 2016, 6 pages.

Notice of Allowance for U.S. Appl. No. 29/525,657, dated Aug. 17, 2017, 7 pages.

Non-Final Office Action for U.S. Appl. No. 29/720,033, dated May 5, 2020, 8 pages.

Notice of Allowance for U.S. Appl. No. 29/720,033, dated Feb. 24, 2021, 7 pages.

Non-Final Office Action for U.S. Appl. No. 14/170,627, dated Oct. 5, 2015, 7 pages.

Final Office Action for U.S. Appl. No. 14/170,627, dated May 2, 2016, 8 pages.

Non-Final Office Action for U.S. Appl. No. 14/170,627, dated Dec. 13, 2016, 7 pages.

Final Office Action for U.S. Appl. No. 14/170,627, dated Jun. 16, 2017, 9 pages.

Non-Final Office Action for U.S. Appl. No. 14/170,627, dated Nov. 29, 2017, 7 pages.

Final Office Action for U.S. Appl. No. 14/170,627, dated Jun. 4, 2018, 9 pages.

Advisory Action for U.S. Appl. No. 14/170,627, dated Sep. 24, 2018, 3 pages.

Non-Final Office Action for U.S. Appl. No. 14/170,627, dated Nov. 6, 2018, 9 pages.

Notice of Allowance and Applicant-Initiated Interview Summary for U.S. Appl. No. 14/170,627, dated Jun. 11, 2019, 11 pages.

Office Action from U.S. Appl. No. 13/429,080, dated Sep. 1, 2015.

Office Action from U.S. Appl. No. 14/716,480, dated Sep. 24, 2015.

Office Action from U.S. Appl. No. 14/170,627, dated Oct. 5, 2015.

Office Action from U.S. Appl. No. 13/368,217, dated Oct. 8, 2015.

Office Action from U.S. Appl. No. 13/464,745, dated Oct. 8, 2015.

Office Action from U.S. Appl. No. 29/466,391, dated Oct. 14, 2015.

Examination Report from Taiwanese Patent Appl. No. 100131021, dated Jan. 5, 2016.

Examination from European Patent Appl. No. 12743003.1-1757, dated Jan. 8, 2016.

Notice of Reasons for Rejection from Japanese Patent Appl. No. 2013-543207, dated Feb. 2, 2016.
Examination from European Patent Appl. No. 13 701 525.1-1757, dated Feb. 3, 2016.
Office Action from U.S. Appl. No. 13/189,535; dated Jan. 6, 2016.
Office Action from U.S. Appl. No. 13/341,741; dated Jan. 8, 2016.
Office Action from U.S. Appl. No. 13/873,303; dated Feb. 2, 2016.
Office Action from U.S. Appl. No. 13/464,745, filed Mar. 1, 2016.
Office Action from U.S. Appl. No. 14/716,480, filed Mar. 3, 2016.
Office Action from U.S. Appl. No. 13/368,217, filed Mar. 4, 2016.
Office Action from U.S. Appl. No. 13/189,535, filed Mar. 18, 2016.
Office Action from U.S. Appl. No. 14/020,757, filed Apr. 7, 2016.
Office Action from U.S. Appl. No. 29/466,391, filed May 10, 2016.
Office Action for U.S. Appl. No. 14/020,757; dated Jul. 19, 2016.
Examination Report from Taiwan Application No. 100131021; dated Jul. 21, 2016.
Office Action for U.S. Appl. No. 14/716,480; dated Aug. 26, 2016.
European Summons for Oral Proceedings for Application No. 12743003.1; dated Sep. 2, 2016.
Office Action for U.S. Appl. No. 13/464,745; dated Sep. 7, 2016.
Notice of Completion of Pretrial Re-examination from Japanese Patent appl. No. 2013-543207, dated Jun. 30, 2015.
Pretrial Report from Japanese Appl. No. 2013-543207, dated Jun. 19, 2015.
Decision of Rejection from Chinese Patent Appl. No. 201180052998.4, dated Jul. 16, 2015.
Office Action from U.S. Appl. No. 12/873,303, dated Jun. 22, 2015.
Response to OA from U.S. Appl. No. 12/873,303, dated Aug. 21, 2015.
Office Action from U.S. Appl. No. 13/341,741, dated Jun. 22, 2015.
Office Action from U.S. Appl. No. 13/443,630, dated Jun. 23, 2015.
Response to OA from U.S. Appl. No. 13/443,630, filed Aug. 21, 2015.
Office Action from U.S. Appl. No. 13/189,535, dated Jul. 14, 2015.
Office Action from U.S. Appl. No. 13/453,924, dated Jul. 21, 2015.
Office Action from U.S. Appl. No. 13/442,746, dated Jul. 27, 2015.
Office Action from U.S. Appl. No. 14/020,757, dated Aug. 3, 2015.
First Office Action from Chinese Patent Appl. No. 2012800369142, dated Mar. 26. 2015.
Office Action from U.S. Appl. No. 13/464,745, dated Apr. 2, 2015.
Office Action from U.S. Appl. No. 13/442,746, dated Apr. 28, 2015.
Office Action from U.S. Appl. No. 13/368,217, dated May 13, 2015.
Office Action from U.S. Appl. No. 13/828,348, dated May 27, 2015.
Office Action from Japanese Design Patent Application No. 2011-18570.
Reason for Rejection from Japanese Design Patent Application No. 2011-18571.
Reason for Rejection from Japanese Design Patent Application No. 2011-18572.
Cree LR24 Architectural LED troffer product information, 2 pages, available at www.cree.com/lighting.
International Search Report and Written Opinion for PCT Application No. PCT/US2011/062396, dated Jul. 13, 2012.
U.S. Appl. No. 12/873,303, filed Aug. 31, 2010, Edmond, et al.
U.S. Appl. No. 12/961,385, filed Dec. 6, 2010, Pickard, et al.
Cree's XLamp XP-E LED's, data sheet, pp. 1-17.
Cree's XLamp XP-G Led's, data sheet, pp. 1-12.
U.S. Appl. No. 12/418,796, filed Apr. 6, 2009, Pickard, et al.
U.S. Appl. No. 13/429,080, filed Mar. 23, 2012, Edmond, et al.
U.S. Appl. No. 13/028,946, filed Feb. 16, 2011, Le, et al.
U.S. Appl. No. 13/306,589, filed Nov. 29, 2011, Tarsa, et al.
International Search Report and Written Opinion for Patent Application No. PCT/US2011/001517. dated Feb. 27, 2012.
U.S. Appl. No. 13/649,052, filed Oct. 10, 2012, Lowes, et al.
U.S. Appl. No. 13/649,067, filed Oct. 10,2012, Lowes, et al.
U.S. Appl. No. 13/207,204, filed Aug. 10, 2011, Athalye, et al.
U.S. Appl. No. 13/365,844.
U.S. Appl. No. 13/662,618, filed Oct. 29, 2012, Athalye, et al.
U.S. Appl. No. 13/462,388, filed May 2, 2012.
U.S. Appl. No. 13/842,150, filed Mar. 15, 2013, Dixon, et al.
U.S. Appl. No. 13/770,389, filed Feb. 19, 2013, Lowes, et al.
U.S. Appl. No. 13/782,820, filed Mar. 1, 2013, Dixon, et al.
XLamp®C family from Cree®, Inc., Product Family Data Sheet, 15 pages.
XLamp®M family from Cree®, Inc., Product Family Data Sheet, 14 pages.
XLamp®X family from Cree®, Inc.. Product Family Data Sheet, 17 pages.
Energy Star® Program Requirements for Solid State Lighting Luminaires, Eligibility Criteria—Version 1.1, final Dec. 19, 2008.
Assist Recommends . . . LED Life for General Lighting: Definition of Life. vol. 1. Issue 1, Feb. 2005.
"IES Approved Method for Measuring Lumen Maintenance of LED light Sources", Sep. 22, 2008, ISBN No. 978-0-87995-227-3. (LM-80).
International Search Report and Written Opinion from PCT Application No. PCT/US2013/021353, dated Apr. 17, 2013.
Search Report and Written Opinion from PCT Patent Appl. No. PCT/US2012/047084, dated Feb. 27, 2013.
Search Report and Written Opinion from PCT Patent Appl. No. PCT/US2012/071800, dated Mar. 25, 2013.
U.S. Appl. No. 12/074,762, filed Mar. 2008, Jacobson, et al.
U.S. Appl. No. 13/442,311, filed Apr. 2012, Lu, et al.
U.S. Appl. No. 13/763,270, filed Feb. 2010, Heeter, et al.
Citadel(tm) SLP Lighting (http://www.slplighting.com/enclosures.html).
Final Rejection issued in Korean Design Appl. No. 30-2011-0038114, dated Jun. 14, 2013.
Final Rejection issued in Korean Design Appl. No. 30-2011-0038115, dated Jun. 14. 2013.
Final Rejection issued in Korean Design Appl. No. 30-2011-0038116, dated Jun. 17, 2013.
International Search Report and Written Opinion from PCT Patent Appl. No. PCT/US2013/035668, dated Jul. 12, 2013.
Notice to Submit a Response from Korean Patent Application No. 30-2011-0038115, dated Dec. 12, 2012.
Notice to Submit a Response from Korean Patent Application No. 30-2011-0038116, dated Dec. 12, 2012.
International Search Report and Written Opinion from Appl. No. PCT/CN2013/072772, dated Dec. 19, 2013.
International Search Report and Written Opinion from PCT/US2013/049225, dated Oct. 24, 2013.
Office Action from U.S. Appl. No. 29/387,171, dated May 2, 2012.
Response to OA from U.S. Appl. No. 29/387,171, filed Aug. 2, 2012.
Office Action from U.S. Appl. No. 12/961,385, dated Apr. 26, 2013.
Response to OA from U.S. Appl. No. 12/961,385, filed Jul. 24, 2013.
Office Action from U.S. Appl. No. 13/464,745, dated Jul. 16, 2013.
Office Action from U.S. Appl. No. 29/368,970, dated Jun. 19, 2012.
Office Action from U.S. Appl. No. 29/368,970, dated Aug. 24, 2012.
Response to OA from U.S. Appl. No. 29/368,970, filed Nov. 26, 2012.
Office Action from U.S. Appl. No. 12/961,385, dated Nov. 6, 2013.
U.S. Appl. No. 14/145,559, filed Dec. 31, 2013, Lui, et al.
U.S. Appl. No. 12/463,709, filed May 11, 2009, Donofrio, et al.
U.S. Appl. No. 11/656,759, filed Jan. 22, 2007, Chitnis, et al.
U.S. Appl. No. 11/899,790, filed Sep. 7, 2007, Chitnis, et al.
U.S. Appl. No. 12/566,195, filed Sep. 24, 2009, Van de Ven, et al.
U.S. Appl. No. 12/704,730, filed Feb. 12, 2010, Van de Ven, et al.
U.S. Appl. No. 14/145,355, filed Dec. 31, 2013, Van de Ven, e al.
U.S. Appl. No. 13/828,348, filed Mar. 14, 2013, Edmond, et al.
U.S. Appl. No. 13/345,215, filed Jan. 6, 2012, Lu, et al.
Office Action from U.S. Appl. No. 13/787,727, dated Jan. 29, 2015.
Office Action from U.S. Appl. No. 13/429,080, dated Feb. 18, 2015.
Office Action from U.S. Appl. No. 13/453,924, dated Mar. 10, 2015.
First Official Action from European Patent Appl. No. 12 743 003.1-1757, dated Jan. 16, 2015.
Second Office Action and Search Report from Chinese Appl. No. 2011800529984, dated Dec. 26, 2014.
Grant Notice from European Appl. No. 13701525.1, dated Nov. 19, 2014.
International Report and Written Opinion from PCT/US2013/049225, dated Jan. 22, 2015.
Office Action from U.S. Appl. No. 13/828,348, dated Nov. 20, 2014.

Office Action from U.S. Appl. No. 12/873,303, dated Nov. 28, 2014.
Office Action from U.S. Appl. No. 13/464,745, dated Dec. 10, 2014.
Office Action from U.S. Appl. No. 13/341,741, dated Dec. 24, 2014.
Office Action from U.S. Appl. No. 13/189,535, dated Jan. 13, 2015.
Decision of Rejection from Japanese Appl. No. 2013-543207, dated Nov. 25, 2014.
Office Action from Mexican Appl. No. 100881. dated Nov. 28, 2014.
Grant Notice from European Appl. No, 13701525.1-1757, dated Nov. 24, 2014.
Preliminary Report on Patentability from PCT/US2013/035668, dated Oct. 14, 2014.
Office Action from U.S. Appl. No. 13/442,746, dated Sep. 15, 2014.
Office Action from U.S. Appl. No. 13/429,080, dated Sep. 16, 2014.
Office Action from U.S. Appl. No. 13/844,431, dated Oct. 10, 2014.
Office Action from U.S. Appl. No. 13/443,630, dated Oct. 10, 2014.
Office Action from U.S. Appl. No. 13/368,217, dated Oct. 22, 2014.
Office Action from U.S. Appl. No. 12/961,385, dated Nov. 6, 2014.
Office Action from U.S. Appl. No. 13/453,924, dated Nov. 7, 2014.
Office Action from U.S. Appl. No. 13/464,745, dated Jul. 16, 2014.
Communication from European Patent Appl. No. 13701525.1-1757, dated Sep. 26, 2014.
International Preliminary Report on Patentability and Written Opinion from PCT/US2013/021053, dated Aug. 21, 2014.
International Preliminary Report on Patentabiliby from PCT/US2012/071800 dated Jul. 10, 2014.
Office Action from U.S. Appl. No. 13/189,535, dated Jun. 20, 2014.
Office Action from U.S. Appl. No. 13/453,924, dated Jun. 25, 2014.
Office Action from U.S. Appl. No. 13/443,630, dated Jul. 1, 2014.
Reasons for Rejection from Japanese Patent Appl. No. 2013-543207. dated May 20, 2014.
First Office Action from Chinese Patent Appl No. 2011800529984. dated May 4, 2014.
Office Action from U.S. Appl. No. 13/544,662, dated May 5, 2014.
Office Action from U.S. Appl. No. 13/844,431, dated May 15, 2014.
Office Action from U.S. Appl. No. 13/341,741, dated Jun. 6, 2014.
Office Action from U.S. Appl. No. 13/429,080, dated Apr. 18, 2014.
Office Action from U.S. Appl. No. 12/961,385, dated Mar. 11, 2014.
Preliminary Report and Written Opinion from PCT Appl. No. PCT/US2012/047064, dated Feb, 6, 2014.
Office Action from U.S. Appl. No. 12/961,385, dated Nov. 27, 2015.
Office Action from U.S. Appl. No. 13/828,348, dated Nov. 4, 2015.
Office Action from U.S. Appl. No. 14/020,757, dated Nov. 24, 2014.
First Office Action from Chinese Patent Appl. No. 2011800588770, dated Sep. 25, 2015.
Office Action for Chinese Patent Application No. 2011800588770; dated Sep. 26, 2016.
Notification of Reexamination for Chinese Application No. 2011800529984; dated Oct. 10, 2016.
Office Action for U.S. Appl. No. 13/828,348; dated Oct. 17, 2016.
Office Action for European Application No. 11754767.9; dated Oct. 31, 2016.
Office Action for U.S. Appl. No. 12/873,303; dated Nov. 25, 2016.
Notice of Allowance for Taiwan Application No. 100131021; Dated Nov. 28, 2016.
Office Action for U.S. Appl. No. 13/368,217; dated Jan. 3, 2017.
Office Action for U.S. Appl. No. 14/225,327; dated Mar. 14, 2017.
European Notice of Allowance for Application No. 12743003.1; dated Mar. 17, 2017.
Office Action for U.S. Appl. No. 13/189,535; dated Mar. 23, 2017.
Office Action for U.S. Appl. No. 13/464,745; dated Mar. 23, 2017.
Foreign Office Action for Chinese Application No. 2011800529984; dated Apr. 5, 2017.
Office Action for U.S. Appl. No. 14/721,806; dated Apr. 21, 2017.
Office Action for U.S. Appl. No. 13/443,630; Dated May 18, 2017.
Office Action for U.S. Appl. No. 13/828,348; dated Jun. 2, 2016.
Notice of Reason for Rejection for Japanese Appl. No. 2013-543207; dated May 24, 2016.
Second Office Action for Application No. 2011800588770; dated Mar. 29, 2016.
Office Action from U.S. Appl. No. 13/464,745, dated Mar. 1, 2016.
Office Action from U.S. Appl. No. 14/716,480, dated Mar. 3, 2016.
Office Action from U.S. Appl. No. 13/368,217, dated Mar. 4, 2016.
Office Action from U.S. Appl. No. 13/169,535, dated Mar. 18, 2016.
Office Action from U.S. Appl. No. 14/020,757, dated Apr. 7, 2016.
Office Action from U.S. Appl. No. 29/466,391, dated May 10, 2016.
Office Action for U.S. Appl. No. 14/170,627, dated Jun. 16, 2017.
Office Action for U.S. Appl. No. 14/716,480, dated Jul. 5, 2017.
Office Action for U.S. Appl. No. 12/873,303, dated Aug. 9, 2017.
Office Action for U.S. Appl. No. 13/828,348, dated Sep. 1, 2017.
Office Acton for U.S. Appl. No. 14/225,327, dated Oct. 2, 2017.
Office Action for U.S. Appl. No. 13/189,535, dated Oct. 30, 2017.
Office Action for U.S. Appl. No. 14/721,806, dated Nov. 1, 2017.

* cited by examiner

*Primary Examiner* — Philip S Hyder
(74) *Attorney, Agent, or Firm* — Withrow + Terranova, P.L.L.C.

(57) CLAIM

The ornamental design for a troffer-style fixture, as shown and described herein.

DESCRIPTION

FIG. 1 is a top perspective view of a light fixture according to an embodiment of the present invention.
FIG. 2 is a bottom perspective view of a light fixture according to an embodiment of the present invention.
FIG. 3 is a front elevation view of a light fixture according to an embodiment of the present invention.
FIG. 4 is a right side elevation view of a light fixture according to an embodiment of the present invention.
FIG. 5 is a rear elevation view of a light fixture according to an embodiment of the present invention.
FIG. 6 is a left side elevation view of a light fixture according to an embodiment of the present invention.
FIG. 7 is a top plan view of a light fixture according to an embodiment of the present invention; and,
FIG. 8 is a bottom plan view of a light fixture according to an embodiment of the present invention.
[Elements of the fixtures in the attached figures are in broken lines for illustrative purposes only and form no part of the claimed design.]
*The broken lines depict portions of the troffer-style fixture in which the design is embodied that form no part of the claimed design.*

1 Claim, 6 Drawing Sheets

Figure 8:
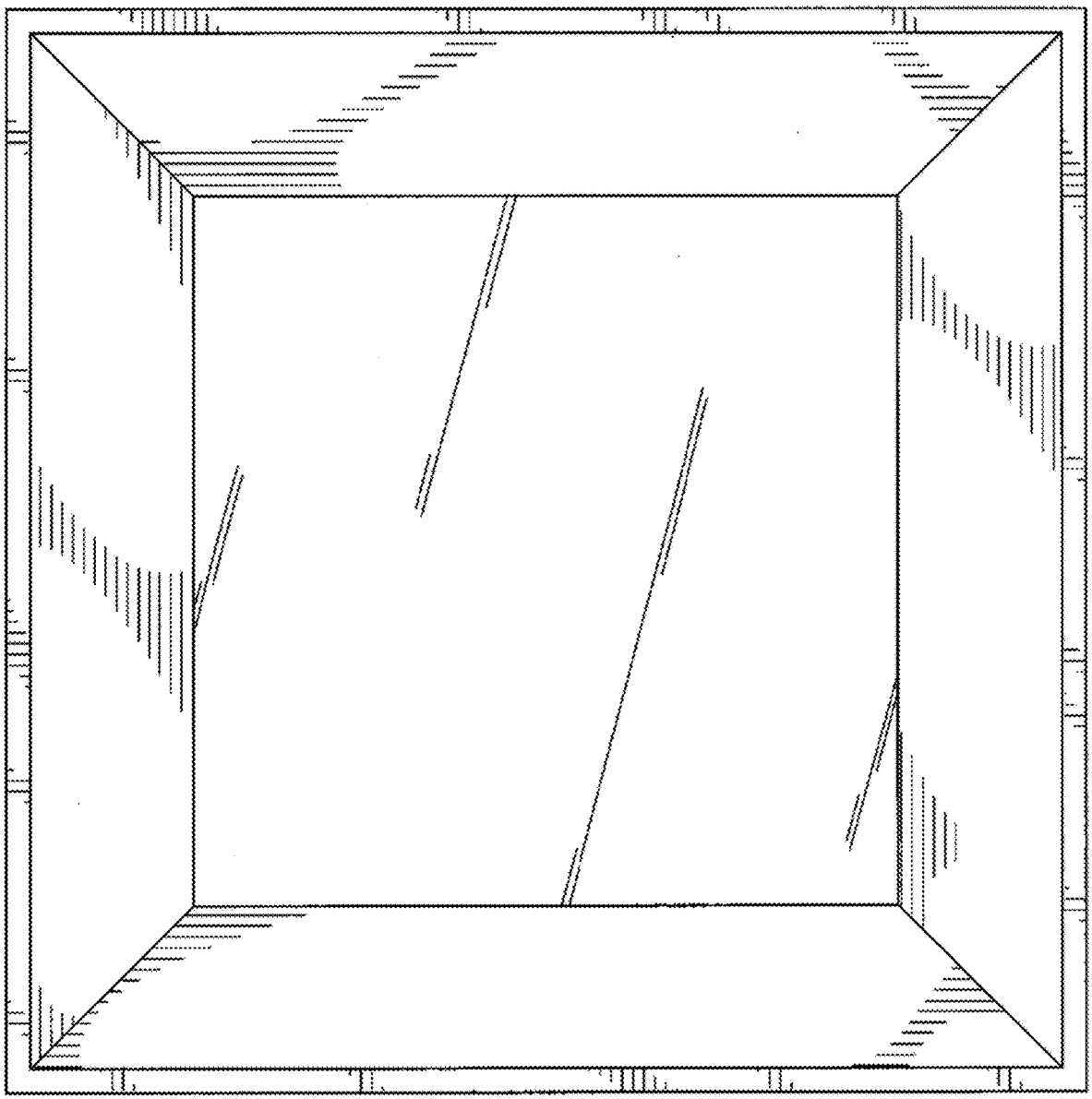

Matter enclosed in heavy brackets [ ] appears in the original patent but forms no part of this reissue; matter printed in italics indicates the additions made by reissue.

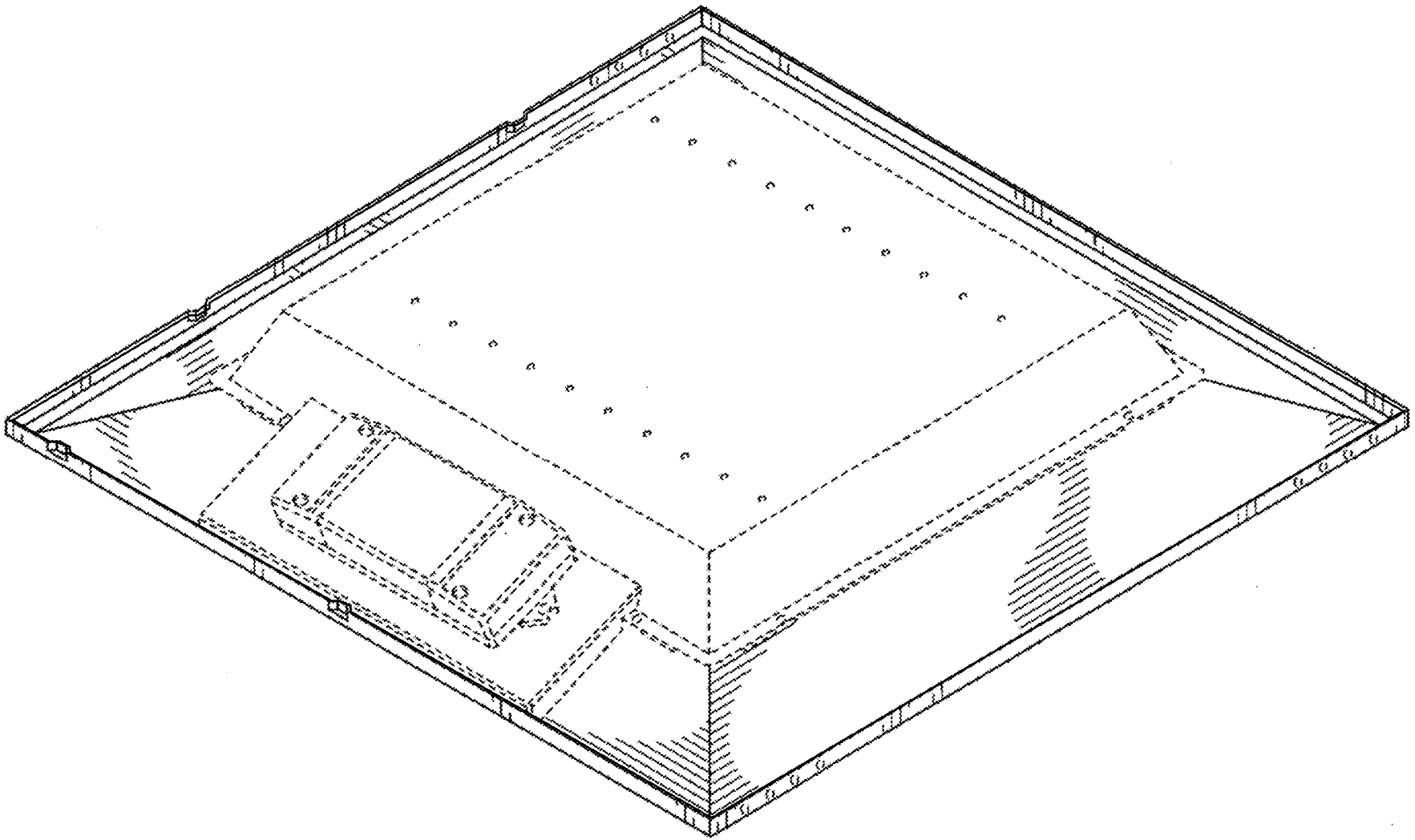
FIG. 1
(Amended)

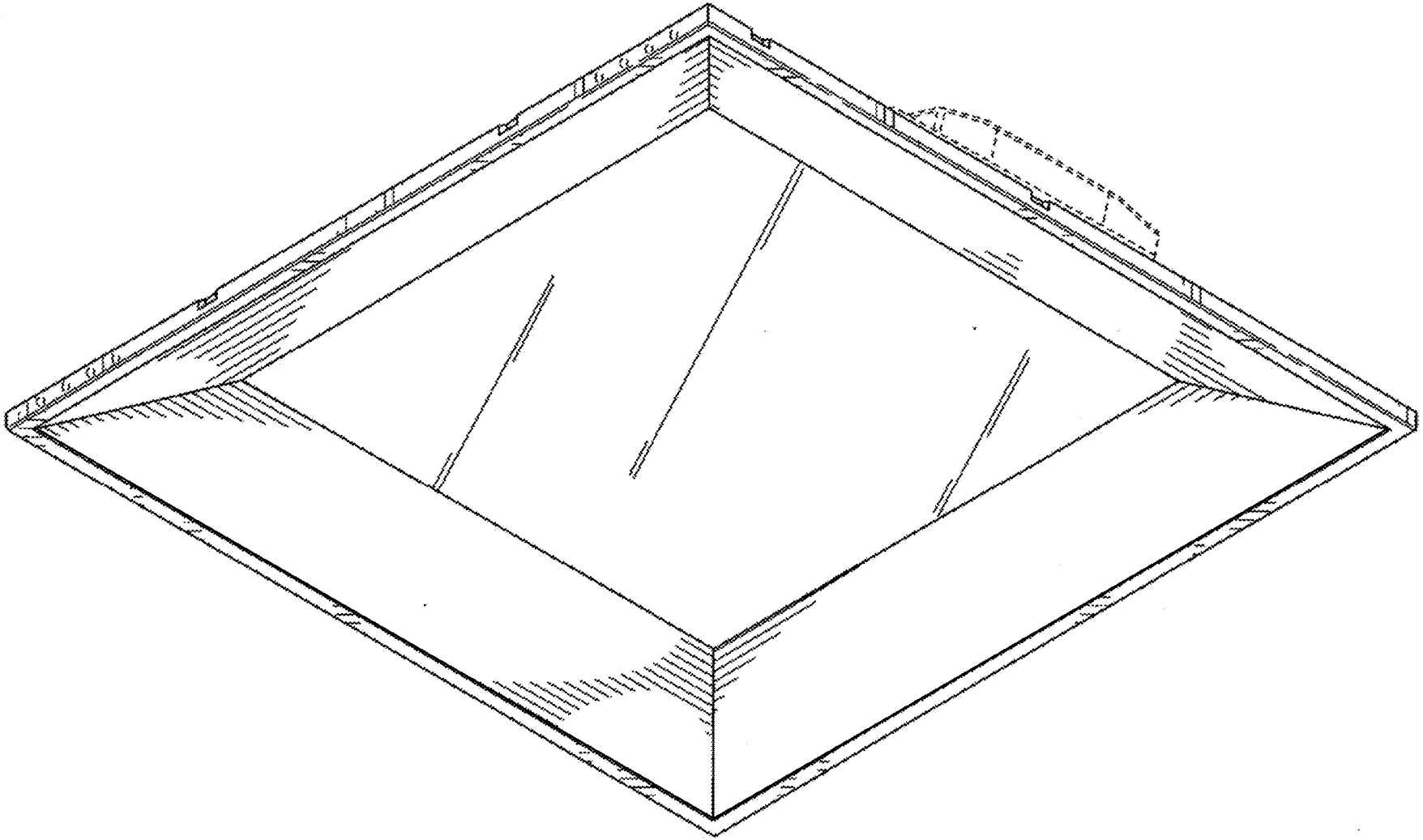
FIG. 2
(Amended)

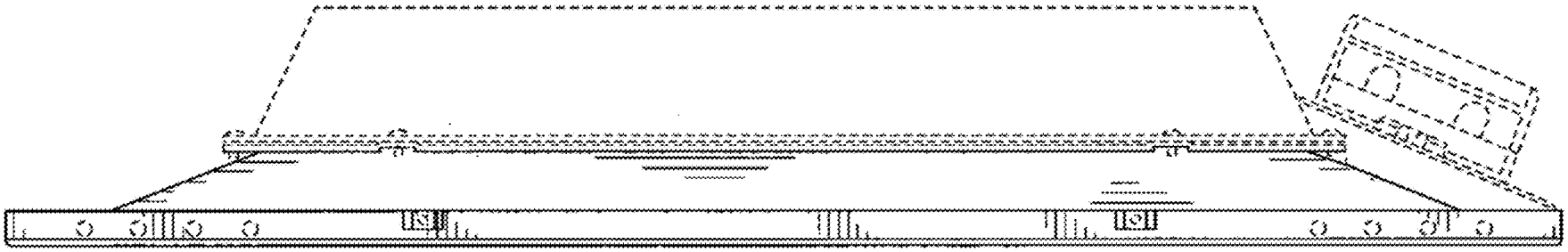
FIG. 3
(Amended)
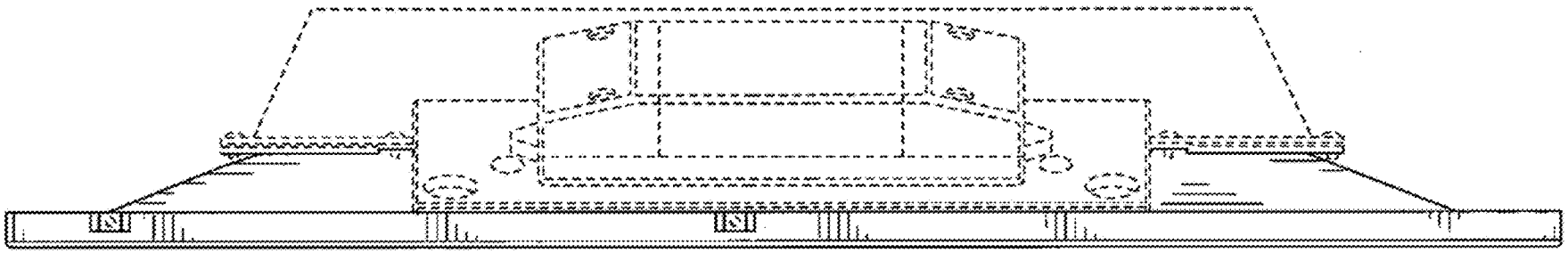
FIG. 4
(Amended)

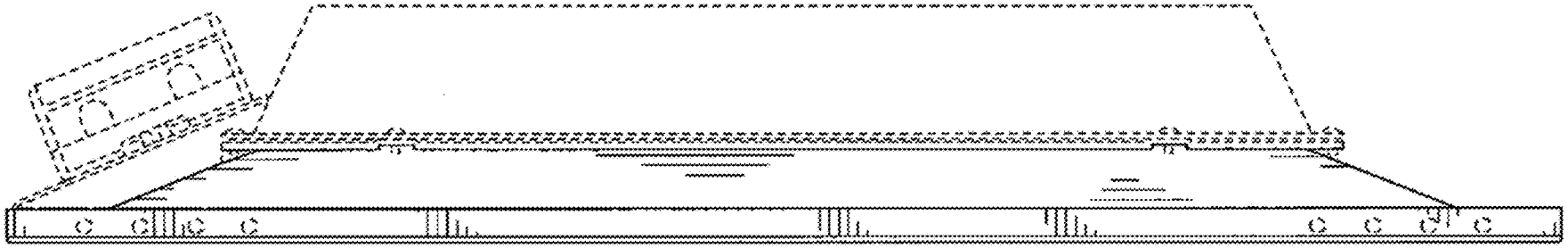
FIG. 5
(Amended)
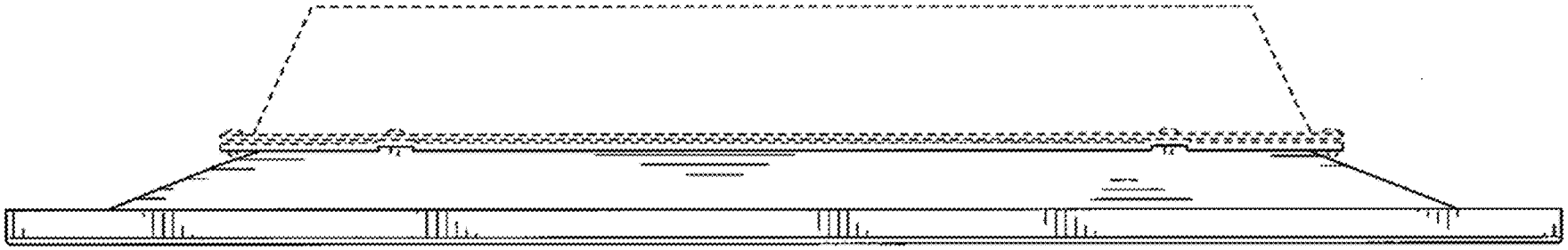
FIG. 6
(Amended)

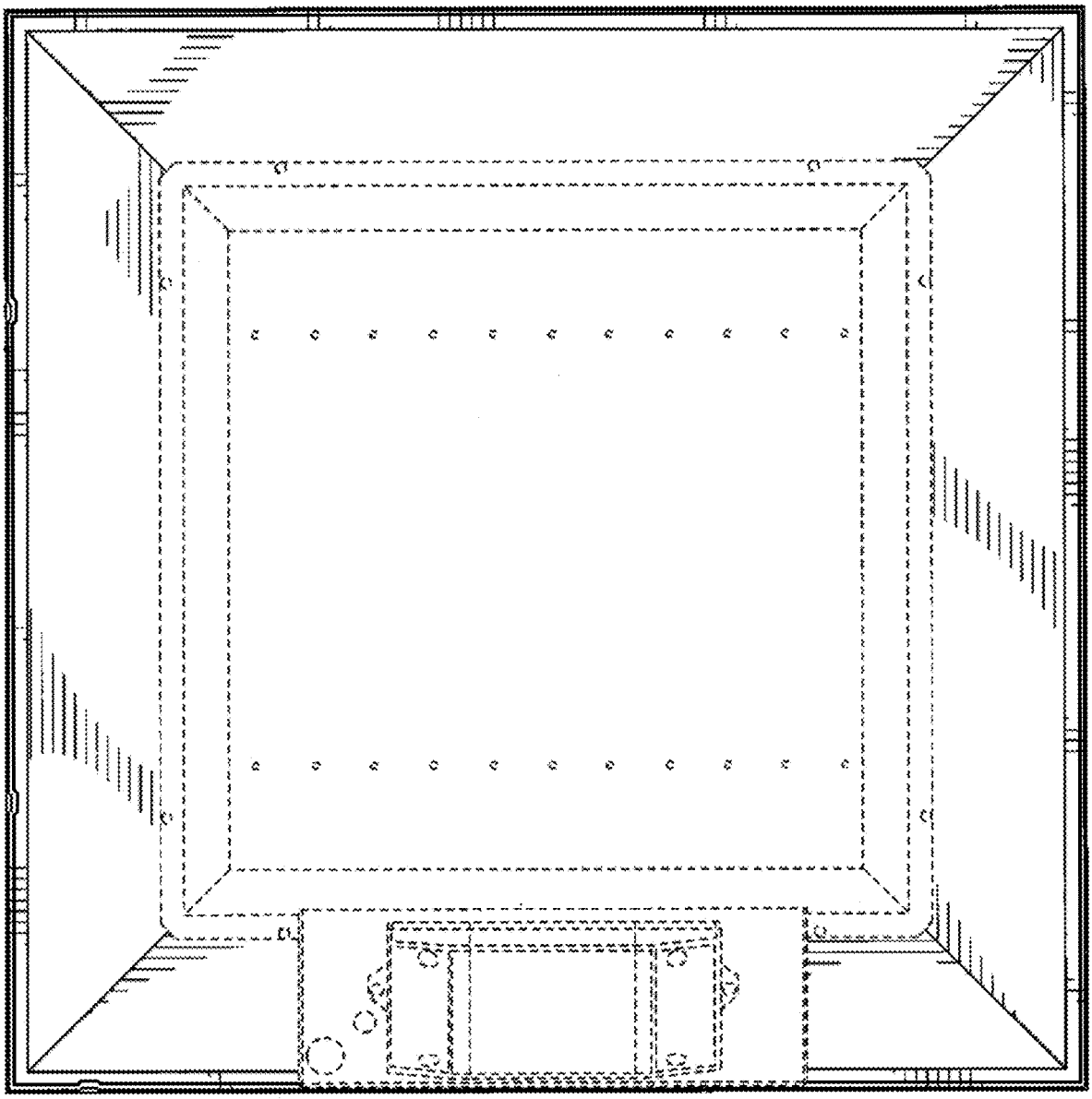
*FIG. 7*
(Amended)